United States Patent
Newberg et al.

(10) Patent No.: US 11,943,537 B2
(45) Date of Patent: Mar. 26, 2024

(54) IMPULSE RESCAN SYSTEM

(71) Applicant: Leica Biosystems Imaging, Inc., Vista, CA (US)

(72) Inventors: Nicholas Newberg, San Marcos, CA (US); Prentash Djelosevic, Oceanside, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 323 days.

(21) Appl. No.: 16/206,631

(22) Filed: Nov. 30, 2018

(65) Prior Publication Data

US 2019/0166293 A1     May 30, 2019

Related U.S. Application Data

(60) Provisional application No. 62/593,119, filed on Nov. 30, 2017.

(51) Int. Cl.
*H04N 23/68*     (2023.01)
*G01P 13/00*     (2006.01)
(Continued)

(52) U.S. Cl.
CPC ....... *H04N 23/685* (2023.01); *G02B 21/0036* (2013.01); *G02B 21/008* (2013.01);
(Continued)

(58) Field of Classification Search
None
See application file for complete search history.

(56) References Cited

U.S. PATENT DOCUMENTS 6,514,722 B2 * 2/2003 Palsson ................. C12M 35/02
                                                                              435/29
6,711,283 B1 * 3/2004 Soenksen ............. G02B 21/002
                                                                              382/133

(Continued)

FOREIGN PATENT DOCUMENTS

AU     2018374385 B2     3/2021
CN     106291897 A     1/2017
(Continued)

OTHER PUBLICATIONS

Mitutoyo, "2D Image Correlation Encoder, MICSYS," Bulletin No. 2029, Jul. 2013.*

(Continued)

*Primary Examiner* — Michael J Hess
(74) *Attorney, Agent, or Firm* — Frost Brown Todd LLP

(57) ABSTRACT

A digital pathology scanning apparatus is configured to initiate a rescan of a portion of a sample responsive to detecting a mechanical vibration during image acquisition that exceeds a predetermined threshold. The digital pathology scanning apparatus includes a plurality of sensors and a processor that analyzes sensor data received during movement of a scanning stage supporting a sample during image acquisition. The processor is configured to identify a mechanical vibration imparted on the scanning stage during image acquisition and determine if the mechanical vibration exceeds a predetermined threshold. If the predetermined threshold is exceeded, the processor is configured to initiate a rescan of the portion of the sample being scanned at the time of the mechanical vibration.

15 Claims, 2 Drawing Sheets

(51) Int. Cl.
  *G02B 21/00* (2006.01)
  *H04N 3/02* (2006.01)
  *H04N 23/67* (2023.01)
  *H04N 25/711* (2023.01)

(52) U.S. Cl.
  CPC ............ *H04N 3/02* (2013.01); *H04N 25/711* (2023.01); *G01P 13/00* (2013.01); *G06T 2207/10056* (2013.01); *G06T 2207/20201* (2013.01); *G06T 2207/30024* (2013.01); *H04N 23/67* (2023.01)

(56) References Cited

U.S. PATENT DOCUMENTS

| | | | |
|---|---|---|---|
| 7,140,738 B2 | 11/2006 | Guiney et al. | |
| 7,763,875 B2 | 7/2010 | Romanov et al. | |
| 8,120,376 B2 | 2/2012 | Hansen | |
| 8,165,363 B2 | 4/2012 | Soenksen et al. | |
| 8,174,574 B2 | 5/2012 | Yamanaka | |
| 8,322,220 B2 | 12/2012 | Prater et al. | |
| 8,782,810 B2 | 7/2014 | Masser | |
| 8,830,574 B2 | 9/2014 | Tafas | |
| 8,904,560 B2 | 12/2014 | Shi et al. | |
| 9,244,096 B2 | 1/2016 | Shi et al. | |
| 9,535,243 B2 * | 1/2017 | Olson | G02B 21/245 |
| 2008/0240613 A1 * | 10/2008 | Dietz | G02B 21/367 |
| | | | 382/284 |
| 2009/0224047 A1 * | 9/2009 | Johnston | G06K 7/10881 |
| | | | 235/449 |
| 2011/0085215 A1 | 4/2011 | Hiraide | |
| 2011/0292200 A1 * | 12/2011 | Van Dijk | G02B 21/245 |
| | | | 348/79 |
| 2013/0182294 A1 * | 7/2013 | French | G06K 7/1473 |
| | | | 358/473 |
| 2014/0218499 A1 * | 8/2014 | Suzuki | G02B 21/26 |
| | | | 348/79 |
| 2014/0340501 A1 | 11/2014 | Hauger et al. | |
| 2015/0109579 A1 * | 4/2015 | Orlowski | G06T 7/337 |
| | | | 351/206 |
| 2016/0191887 A1 * | 6/2016 | Casas | G02B 27/0172 |
| | | | 348/47 |
| 2018/0172971 A1 * | 6/2018 | Zhou | G02B 27/646 |

FOREIGN PATENT DOCUMENTS

| | | |
|---|---|---|
| CN | 107209360 A | 9/2017 |
| CN | 111527438 A | 8/2020 |
| EP | 2299307 A2 | 3/2011 |
| JP | H10-31165 A | 2/1998 |
| JP | 2013-105500 A | 5/2013 |
| JP | 2020-524846 A | 8/2020 |
| WO | WO 2011/156818 A2 | 12/2011 |
| WO | WO 2019/109034 A1 | 6/2019 |

OTHER PUBLICATIONS

International Search Report and Written Opinion dated Feb. 11, 2019 for related International Application No. PCT/US2018/063469, in 14 pages.
First Office Action in Chinese Application No. 201880069032.3 dated Aug. 30, 2021, in 21 pages.
Second Office Action in Chinese Application No. 201880069032.3 dated Mar. 16, 2022, in 18 pages.
Extended European Search Report for European Application No. 18884440.1 dated Jan. 28, 2021 in 6 pages.

* cited by examiner

IMPULSE RESCAN SYSTEM

CROSS-REFERENCE TO RELATED APPLICATIONS

This application claims priority to U.S. Provisional Patent Application No. 62/593,119, filed on Nov. 30, 2017, which is hereby incorporated herein by reference as if set forth in full.

BACKGROUND

Field of the Invention

The present invention generally relates to a digital slide scanning apparatus and more particularly relates to image artifacts introduced in a digital image due to mechanical impulses.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster and cheaper diagnosis, prognosis and prediction of important diseases such as cancer.

Mechanical impulses applied to a digital slide scanning apparatus can cause negative image artifacts in the resulting digital image. Mechanical impulses can originate from the digital slide scanning apparatus itself or from any of a variety of external sources. Conventional digital slide scanning apparatus suffer from the negative image artifacts caused by mechanical impulses. Therefore, what is needed is a system and method that overcomes these significant problems found in the conventional systems as described above.

SUMMARY

Accordingly, described herein is a digital pathology scanning apparatus that is configured to identify mechanical impulses that are applied to a scanning stage of the digital pathology scanning apparatus during image acquisition. The digital pathology scanning apparatus is also configured to determine when a mechanical impulse exceeds a predetermined threshold and to cause the sample (or a portion thereof) to be rescanned if the mechanical impulse exceeds the predetermined threshold. This is advantageously accomplished without the cost of adding additional sensors and/or accelerometers to the digital pathology scanning apparatus.

In an embodiment, a digital slide scanning apparatus includes a scanning stage configured to support a sample and move the sample in a controlled direction relative to an imaging system to digitize a portion of the sample, one or more sensors configured to generate sensor data during movement of the scanning stage in the controlled direction, and a processor configured to control movement of the scanning stage in the controlled direction and further configured to analyze sensor data generated by the one or more sensors during movement of the scanning stage in the controlled direction. The processor is also configured to identify an event in the sensor data based on one or more of a duration and a distance of a detected movement of the scanning stage in a non-controlled direction during movement of the scanning stage in the controlled direction. If an identified event exceeds a predetermined threshold, the processor is configured to initiate a re-scan of the portion of the sample being scanned when the identified event occurred.

In an embodiment, a method of scanning a sample includes moving a scanning stage in a controlled direction relative to an imaging system, digitizing a portion of a sample supported by the scanning stage during said movement of the scanning stage in the controlled direction, using one or more sensors to generate sensor data during said movement of the scanning stage in the controlled direction and analyzing the sensor data generated by the one or more sensors during movement of the scanning stage in the controlled direction. The method further includes identifying an event in the sensor data based on the analysis, wherein the event comprises a one or more of a duration and a distance of a detected movement of the scanning stage in a non-controlled direction during movement of the scanning stage in the controlled direction. If the identified event exceeds a predetermined threshold, the method also includes initiating a re-digitizing of at least the portion of the sample being digitized by the imaging system when the identified event occurred.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide systems and methods for initiating a rescan of a portion of a sample responsive to detecting a mechanical vibration during image acquisition that exceeds a predetermined threshold. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Method

Figure 1:
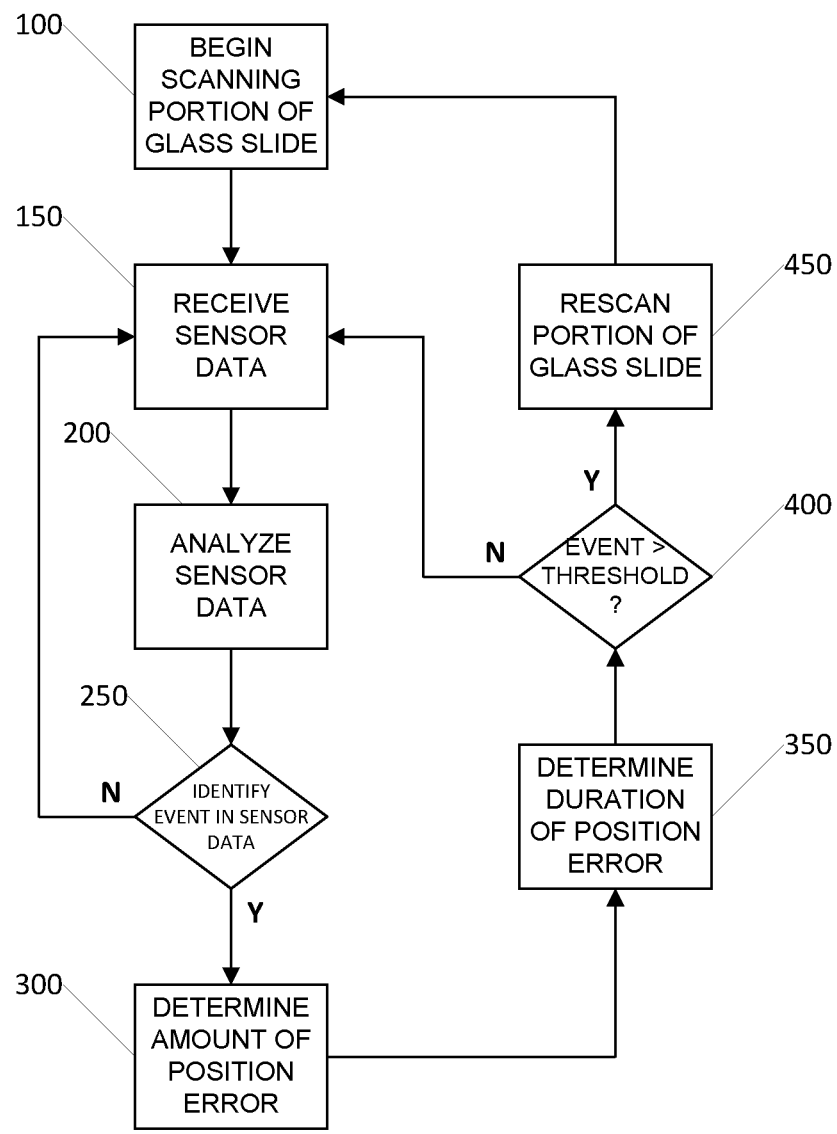
FIG. 1 is a flow diagram illustrating an example process for initiating a rescan of a portion of a glass slide responsive to a mechanical vibration according to an embodiment of the invention.

FIG. 1 is a flow diagram illustrating an example process for initiating a rescan of a portion of a glass slide responsive to a mechanical vibration according to an embodiment of the invention. The process may be carried out by a digital pathology scanning apparatus such as is later described with respect to FIGS. 2A-D. Initially, in step 100 the digital pathology scanning apparatus begins scanning a portion of a sample, for example a specimen on a glass slide. Scanning a sample comprises moving the scanning stage in a controlled direction relative to an imaging system that digitizes an image of the sample. A processor of the digital pathology scanning apparatus controls movement of the scanning stage. The controlled direction may include any direction that the processor instructs the scanning stage to move. In one embodiment, the processor may instruct the scanning stage to move in any X,Y,Z direction for any distance and the controlled direction includes both the direction and the distance of instructed movements.

Next, and during scanning of the sample, one or more sensors generate sensor data and the sensor data is received in step 150 by a processor of the digital pathology scanning device. The one or more sensors may include position encoders that sense position/movement information. The one or more sensors may also include accelerometers that sense position/movement information. Next, in step 200 the processor analyzes the sensor data. If the processor identifies any information in the sensor data that does not correspond to a movement in a controlled direction (e.g., an instruction from the processor to move the scanning stage in a certain direction for a certain distance), then in step 250 an event is identified that corresponds to the movement in the non-controlled direction. The processor continues to receive and analyze sensor data and identify events during the entire scanning process of the sample.

For each event that is identified, in step 300 the processor determines an amount of movement in the non-controlled direction. For example, the processor determines an amount (e.g., a distance) of the movement in the non-controlled direction. In an embodiment, this amount may be an amount of position error recorded by a position sensor. In step 350 the processor also determines a duration of the movement in the non-controlled direction. If a combination of the amount and the duration of the non-controlled movement of the event exceeds a predetermined threshold, as determined in step 400 then in step 450 the processor initiates a re-scan of the portion of the sample that was being digitized at the time of the event. Alternatively, if only the amount of the non-controlled movement of the event exceeds a predetermined threshold, the processor may still initiate a re-scan of the portion of the sample that was being digitized at the time of the event. Alternatively, if only the duration of the non-controlled movement of the event exceeds a predetermined threshold, the processor may still initiate a re-scan of the portion of the sample that was being digitized at the time of the event. In one embodiment, a re-scan comprises re-scanning a complete stripe. However, if the event or any element of the event (e.g., duration or amount) does not exceed the predetermined threshold, then the processor continues scanning the sample.

In one embodiment, movement in a non-controlled direction may, for example, be caused by a vibration that is imparted to the scanning stage by the digital pathology scanning apparatus itself or by some force outside of the digital pathology scanning apparatus. A significant problem with vibration imparted to the scanning stage is that movement of the scanning stage in a non-controlled direction can adversely impact the quality of the resulting digital slide image. For example, the focus of the digital slide image may be adversely impacted. Also, the ability of a portion of the digital slide image (e.g., a stripe) to be combined with other portions of the digital slide image may be adversely impacted. For example, if a vibration caused the scanning stage to drift such that the resulting image stripe did not overlap with its adjacent stripe, the non-overlapping area would frustrate the ability of the digital pathology scanning apparatus to combine the stripes into a whole slide image.

2. Example Embodiments

In one embodiment, a digital pathology scanning apparatus includes a scanning stage that is configured to support a sample and move the sample in a controlled direction relative to an imaging system to digitize a portion of the sample. The digital pathology scanning apparatus also includes one or more sensors configured to generate sensor data during movement of the scanning stage in the controlled direction. In one embodiment, the digital pathology scanning apparatus includes three sensors and each of the sensors is configured to sense movement in a specific axis, for example a first sensor is configured to sense movement in the X axis, a second sensor is configured to sense movement in the Y axis, and a third sensor is configured to sense movement in the Z axis. In one embodiment, the sensors are position encoders. The sensor data may include position data or movement data or both. The digital pathology scanning apparatus also includes a processor that is configured to control movement of the scanning stage in the controlled direction and further configured to analyze the sensor data generated by the one or more sensors during movement of the scanning stage in the controlled direction. The processor is also configured to identify an event in the analyzed sensor data based on one or more of a duration and a distance of a movement of the scanning stage in a non-controlled direction during movement of the scanning stage in the controlled direction. The processor is also configured to initiate a re-scan of the portion of the sample being scanned by the imaging system when the identified event occurred.

In one embodiment, the one or more sensors comprise one or more position encoders that operate in cooperation with the processor to control movement of the scanning stage in the controlled direction. In one embodiment, the one or more sensors comprise an accelerometer configured to detect a movement of the scanning stage in the non-controlled direction. In one embodiment, the one or more sensors comprise one or more position encoders configured to detect a position of the scanning stage and one or more accelerometers configured to detect a movement of the scanning stage in the non-controlled direction.

In one embodiment, the predetermined threshold is based solely on a duration of a detected movement in a non-controlled direction. In one embodiment, the predetermined threshold is based solely on a distance of a detected movement in a non-controlled direction. In one embodiment, the predetermined threshold is based a combination of a distance of a detected movement in a non-controlled direction and a duration of a detected movement in a non-controlled direction.

In one embodiment, a method of digitizing a sample using a digital pathology scanning apparatus comprises moving a scanning stage in a controlled direction relative to an imaging system and digitizing a portion of the sample supported by the scanning stage during said movement of the scanning stage in the controlled direction. During movement of the scanning stage in the controlled direction, the method uses one or more sensors to generate sensor data. The sensor data may include position data or movement data or both. The method further includes analyzing the sensor data generated by the one or more sensors during movement of the scanning stage in the controlled direction and identifying an event in the sensor data based on the analysis, wherein the identified event comprises one or more of a duration and a distance of a detected movement of the scanning stage in a non-controlled direction. The method also includes initiating a re-digitizing of the portion of the sample being digitized by the imaging system when the identified event occurred, if the identified event exceeds a predetermined threshold.

In one embodiment, the one or more sensors comprise position encoders that operate in cooperation with a processor to control movement of the scanning stage in the controlled direction. In one embodiment, the one or more sensors comprise an accelerometer configured to detect a movement of the scanning stage in the non-controlled direction. In one embodiment, the predetermined threshold is based solely on a duration of a detected movement in a non-controlled direction. In one embodiment, the predetermined threshold is based solely on a distance of a detected movement in a non-controlled direction. In one embodiment, the predetermined threshold is based a combination of a distance of a detected movement in a non-controlled direction and a duration of a detected movement in a non-controlled direction.

3. Example Digital Slide Scanning Apparatus

The various embodiments described herein may be implemented using a digital pathology scanning device such as described with respect to FIGS. 2A-2D.

Figure 2A:
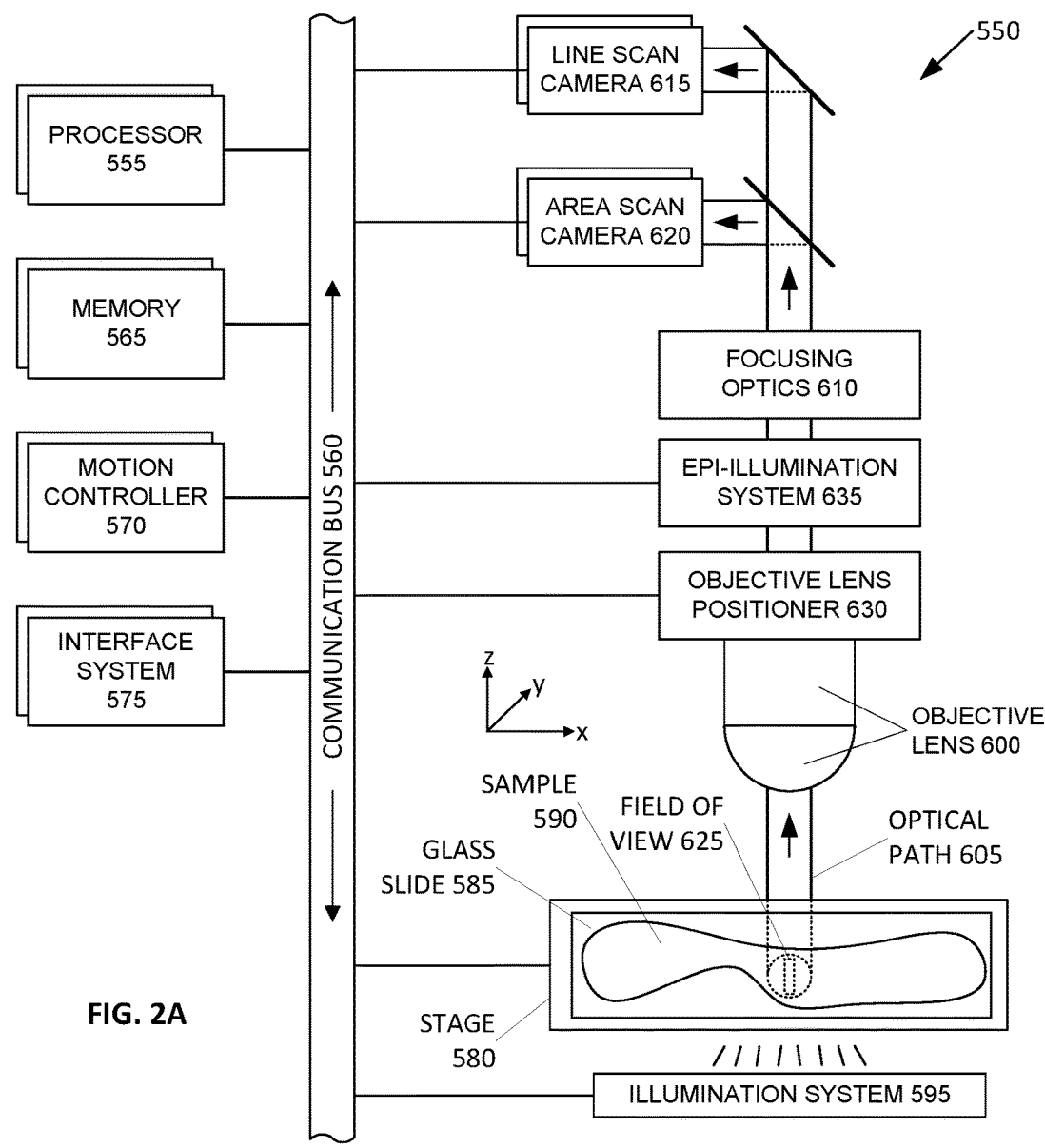
FIG. 2A is a block diagram illustrating an example processor enabled device 550 that may be used in connection with various embodiments described herein.

FIG. 2A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system or a digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

In an embodiment, the motion control system 570 comprises one or more sensors that are configured to generate sensor data during movement of the scanning stage 580 in a controlled direction in cooperation with the processor 555. For example, the one or more sensors may include one or more position encoders that provide information to the processor 555 during movement of the scanning stage 580 in the controlled direction in part to allow the processor 555 to precisely control movement of the scanning stage 580 and in part to allow the processor 555 to analyze the position encoder information to identify any movements of the scanning stage 580 in a non-controlled direction. Movement in a non-controlled direction may, for example, be caused by a vibration that is imparted to the scanning stage 580 by the digital pathology scanning apparatus itself or by some force outside of the digital pathology scanning apparatus. Additionally, or alternatively, the one or more sensors may include one or more accelerometers that provide information to the processor 555 during movement of the scanning stage 580 in the controlled direction, wherein the information is related to movement of the scanning stage 580 in the controlled direction and movement of the scanning stage 580 in a non-controlled direction. The information from the accelerometers allows the processor 555 to precisely control movement of the stage in the controlled direction and also allows the processor 555 to analyze the accelerometer information to identify any movements of the scanning stage 580 in a non-controlled direction. Advantageously, the one or more sensors (e.g., position encoders or accelerometers) are configured to precisely detect the position and/or movement of the scanning stage during digitization of a sample and the processor 555 is configured to analyze the sensor data to identify any undesired movement of the scanning stage in a non-controlled direction based on the precisely detected position and/or movement of the scanning stage during digitization of the sample.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices such as an image server system, an operator station, a user station, and an administrative server system that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated X-Y grid to aid in the location of the sample 590 on the movable stage 580. In an embodiment, the movable stage 580 is a linear motor based X-Y stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2X magnification changer allows a native 20X objective lens 600 to scan the sample 590 at 40X magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion of the sample 590 or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

Figure 2B:
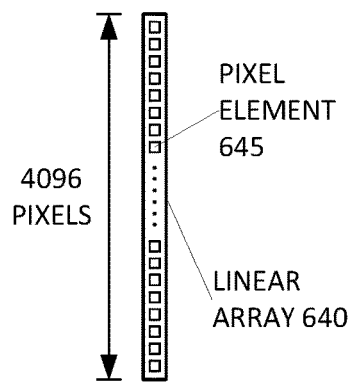
FIG. 2B is a block diagram illustrating an example line scan camera having a single linear array.

FIG. 2B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figure 2C:
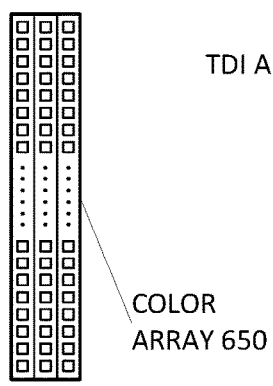
FIG. 2C is a block diagram illustrating an example line scan camera having three linear arrays.

FIG. 2C illustrates a line scan camera having three linear arrays, each of which may be implemented as a CCD array. The three linear arrays combine to form a color array 650. In an embodiment, each individual linear array in the color array 650 detects a different color intensity, (e.g., red, green, or blue). The color image data from each individual linear array in the color array 650 is combined to form a single field of view 625 of color image data.

Figure 2D:
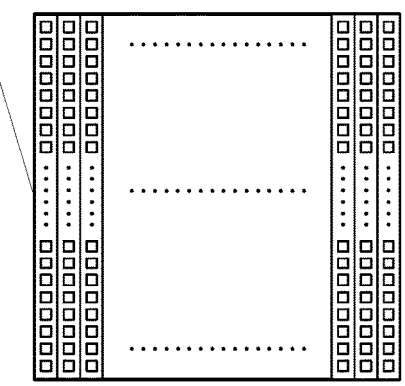
FIG. 2D is a block diagram illustrating an example line scan camera having a plurality of linear arrays.

FIG. 2D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital pathology scanning apparatus, comprising:
a scanning stage configured to support a sample and move the sample in a controlled direction relative to an imaging system, the imaging system configured to scan the sample as a plurality of lines based on movement of the sample in the controlled direction, each of the plurality of lines overlapping with its adjacent line, wherein the imaging system is configured to combine the scanned lines into a whole slide image;
a processor configured to control movement of the scanning stage in the controlled direction; and
one or more hardware position encoders that are configured to generate sensor data during movement of the scanning stage in the controlled direction,
wherein the processor is configured to:
detect a movement of the scanning stage in the controlled direction and in a direction that is different from the controlled direction based on the sensor data,
determine if a duration of the detected movement exceeds a predetermined duration threshold,
determine if a distance of the detected movement exceeds a predetermined distance threshold, wherein the predetermined duration and distance thresholds are determined based on detecting a vibration-induced drift in the movement of the scanning stage that causes one or more adjacent lines of the plurality of lines to not overlap and frustrates the ability of the imaging system to combine the lines into the whole slide image, and
in response to determining that the detected movement exceeds one or more of the predetermined duration and distance thresholds, initiate a re-scan of the portion of the sample corresponding to the one or more adjacent lines of the plurality of lines that do not overlap.

2. The apparatus of claim 1, wherein the processor is further configured to:
identify an event in response to the detected movement being in the direction that is different from the controlled direction,
wherein the determination of if the duration of the detected movement exceeds the predetermined duration threshold and the determination of if the distance of the detected movement exceeds the predetermined distance threshold are performed in response to the identifying of the event.

3. The apparatus of claim 1, wherein the re-scan comprises a re-scanning of an entire line of the plurality of lines corresponding to the line scanned when the movement was detected.

4. The apparatus of claim 1, wherein the one or more hardware position encoders comprise a first hardware position encoder configured to sense movement in an X axis, a second hardware position encoder configured to sense movement in a Y axis, and a third hardware position encoder configured to sense movement in an Z axis.

5. The apparatus of claim 1, further comprising:
an accelerometer configured to generate acceleration data during movement of the scanning stage in the controlled direction,
wherein the processor is further configured to detect the movement of the scanning stage in the controlled direction and in the direction that is different from the controlled direction based on the accelerometer data.

6. A method comprising:
moving a scanning stage in a controlled direction relative to an imaging system;
digitizing, via the imaging system, a portion of a sample supported by the scanning stage during the movement of the scanning stage in the controlled direction, the imaging system configured to scan the sample as a plurality of lines based on movement of the sample in the controlled direction, each of the plurality of lines overlapping with its adjacent line, wherein the imaging system is configured to combine the scanned lines into a whole slide image;

controlling, using a processor, movement of the scanning stage in the controlled direction;

generating, using one or more hardware position encoders, sensor data during the movement of the scanning stage in the controlled direction;

detecting, using the processor, movement of the scanning stage in the controlled direction and in a direction that is different from the controlled direction;

determining, using the processor, if a duration of the detected movement exceeds a predetermined duration threshold;

determining, using the processor, if a distance of the detected movement exceeds a predetermined distance threshold, wherein the predetermined duration and distance thresholds are determined based on detecting a vibration-induced drift in the movement of the scanning stage that causes one or more adjacent lines of the plurality of lines to not overlap and frustrates the ability of the imaging system to combine the lines into the whole slide image; and in response to determining that the detected movement exceeds one or more of the predetermined duration and distance thresholds, initiating, using the processor, a re-digitizing of the portion of the sample corresponding to the one or more adjacent lines of the plurality of lines that do not overlap.

7. The method of claim 6, further comprising:
identifying an event in response to the detected movement being in the direction that is different from the controlled direction, wherein the determination of if the duration of the detected movement exceeds the predetermined duration threshold and the determination of if the distance of the detected movement exceeds the predetermined distance threshold are performed in response to the identifying of the event.

8. The method of claim 6, wherein the re-digitizing comprises re-scanning an entire line of the plurality of lines corresponding to the line scanned when the movement was detected.

9. The method of claim 6, wherein the one or more hardware position encoders comprise a first hardware position encoder configured to sense movement in an X axis, a second hardware position encoder configured to sense movement in a Y axis, and a third hardware position encoder configured to sense movement in an Z axis.

10. The method of claim 6, further comprising:
generating, using an accelerometer, acceleration data during movement of the scanning stage in the controlled direction, wherein the detection of the movement of the scanning stage in the controlled direction and in the direction that is different from the controlled direction is further based on the accelerometer data.

11. A non-transitory computer readable medium having stored thereon one or more sequences of instructions for causing one or more processors to:

move a scanning stage in a controlled direction relative to an imaging system;

digitize, via the imaging system, a portion of a sample supported by the scanning stage during the movement of the scanning stage in the controlled direction, the imaging system configured to scan the sample as a plurality of lines based on movement of the sample in the controlled direction, each of the plurality of lines overlapping with its adjacent line, wherein the imaging system is configured to combine the scanned lines into a whole slide image;

control movement of the scanning stage in the controlled direction;

generate, using one or more hardware position encoders, sensor data during the movement of the scanning stage in the controlled direction;

detect movement of the scanning stage in the controlled direction and in a direction that is different from the controlled direction;

determine if a duration of the detected movement exceeds a predetermined duration threshold;

determine if a distance of the detected movement exceeds a predetermined distance threshold, wherein the predetermined duration and distance thresholds are determined based on detecting a vibration-induced drift in the movement of the scanning stage that causes one or more adjacent lines of the plurality of lines to not overlap and frustrates the ability of the imaging system to combine the lines into the whole slide image; and in response to determining that the detected movement exceeds the one or more of the predetermined duration and distance thresholds, initiate a re-digitizing of the portion of the sample corresponding to the one or more adjacent lines of the plurality of lines that do not overlap.

12. The non-transitory computer readable medium of claim 11, wherein the one or more sequences of instructions further cause the one or more processors to:

identify an event in response to the detected movement being in the direction that is different from the controlled direction, wherein the determination of if the duration of the detected movement exceeds the predetermined duration threshold and the determination of if the distance of the detected movement exceeds the predetermined distance threshold are performed in response to the identifying of the event.

13. The non-transitory computer readable medium of claim 11, wherein the re-digitizing comprises a re-scanning of an entire line of the plurality of lines corresponding to the line scanned when the movement was detected.

14. The non-transitory computer readable medium of claim 11, wherein the one or more hardware position encoders comprise a first hardware position encoder configured to sense movement in an X axis, a second hardware position encoder configured to sense movement in a Y axis, and a third hardware position encoder configured to sense movement in an Z axis.

15. The non-transitory computer readable medium of claim 11, wherein the one or more sequences of instructions further cause the one or more processors to:

generate, using an accelerometer, acceleration data during movement of the scanning stage in the controlled direction, wherein the detection of the movement of the scanning stage in the controlled direction and in the direction that is different from the controlled direction is further based on the accelerometer data.

* * * * *